T. H. COVEY.
PROCESS OF OBTAINING OIL AND STOCK FOOD FROM COTTON SEED.
APPLICATION FILED SEPT. 19, 1912.
1,067,975. Patented July 22, 1913.
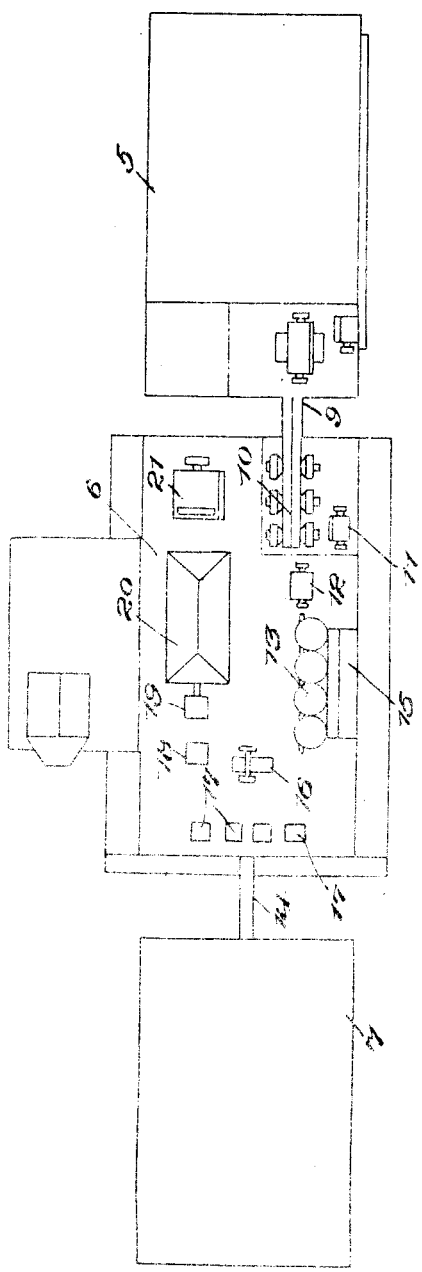

UNITED STATES PATENT OFFICE.

THOMAS H. COVEY, OF CLEBURNE, TEXAS.

PROCESS OF OBTAINING OIL AND STOCK FOOD FROM COTTON-SEED.

1,067,975.     Specification of Letters Patent.     Patented July 22, 1913.

Application filed September 19, 1912. Serial No. 721,296.

*To all whom it may concern:*

Be it known that I, THOMAS H. COVEY, a citizen of the United States, residing at Cleburne, in the county of Johnson and State of Texas, have invented certain new and useful Improvements in Processes of Obtaining Oil and Stock Food from Cotton-Seed, of which the following is a specification, reference being had to the accompanying drawings.

This invention relates to an improved process for preparing stock food and extracting oil from cotton seed and has for its primary object to provide such a process whereby a greater quantity of oil may be obtained from a predetermined amount of seed and a highly nutritious stock food compounded in a scientific manner.

Another object of the invention is to effect a material economy in labor, and eliminate waste of the residue after the oil has been extracted from the seed, thereby minimizing the cost of production of the food.

Still another object of the invention is to produce a process for preparing a stock food from cotton seed after the oil has been extracted wherein the hulls of the seeds are proportionately mixed with the meat so as to regulate the percentage of protein in the resultant compound, then cooking the same at a temperature above the boiling point of water whereby the mixture is thoroughly sterilized and all germs killed, thus producing a food of superior quality than is possible in the use of present known processes.

With the above and other objects in view the present invention consists in a process the steps of which will be specifically pointed out in the following description and embodied in the appended claims.

Reference is to be had to the accompanying drawing which illustrates diagrammatically the preferred arrangement of the several machines by means of which my process is to be carried out in practice.

Referring in detail to the drawing 5 indicates a seed house into which the cotton seed are deposited, after the cotton has been removed therefrom; 6 indicates the mill, and 7 a depository for the excess hulls and the motes. The seed are adapted to be elevated from the seed house 5 and deposited in a suitable cleaning machine. After the portions of pod and other refuse matter adhering to the seeds have been removed by the cleaning machine, the seed are delivered by means of the conveyers 9 to the delinting machines 10 which remove the lint and motes from the seed. The delinted cotton seed are then delivered to a hulling machine 11, where the seed are completely hulled and ground. From the hulling machine the meats and hulls are delivered to the rollers 12 to thoroughly crush the meat, after which the crushed meat and hulls are delivered by means of a suitable conveyer to the cookers 13. It is to be understood that all of the hulls removed from the seed are not mixed with the meat, the amount of hulls or crude fiber in the mixture varying from thirty to a hundred per cent. The excess hulls are received upon a suitable conveyer 14 and carried thereby to the bin or house 7. The excess meat may be deposited in a suitable receptacle 15 and the mixture of crushed meat and hulls which has been placed in the cookers 13 is steam cooked until the oil cells will exude the oil contained therein. When in this state the mixture is delivered to a cake former 16 where the same is formed into cakes and is then delivered to the presses 17 in which the mixture is subjected to pressure and the oil extracted therefrom, the pressed substance which contains not less than thirty per cent. of the hulls or crude fiber, also contains a free extract of nitrogen, protein and fat. In the presses 17 the cooked mixture which is placed in the usual press cloth, is subjected to hydraulic pressure varying from four thousand to ten thousand pounds per square inch, surface measurement. The pressure will of course vary in accordance with the proportion of hulls or crude fiber used in the mixture. It is in this last named step of the process that a material saving in the meat or crushed seed is effected.

In all processes for producing stock food compounds from cotton seed that I am familiar with, a considerable quantity of refuse accumulates in the press so that an appreciable quantity of the oil extracted from the meat is lost in refining the same. By mixing the crushed hulls with the meat and cooking the same together, the mixture may be subjected to great pressure without leaving a detrimental quantity of "foots" or refuse in the presses.

It is preferable that during the cooking process of the mixed meat and hulls that the same be thoroughly agitated and to this end the agitators in the cookers are revolved at a speed of approximately eighty revolutions a minute. It has been found in practice that a steam pressure of substantially sixty pounds and the constant temperature of 212 degrees Fahrenheit for a period of thirty-five minutes will produce the desired result.

After the pressed cakes have been removed from the presses 17 and the press cloths stripped from the cakes, they are placed upon a scale 18 and weighed to determine the quantity and condition of the product, after which the cakes are fed to a breaker 19 where the same are broken up into small pieces. From the breaker the food is discharged into a bin 20 and is now in condition for delivery. If, however, a meal is desired, the broken pieces of cake are fed to a mill indicated at 21 which thoroughly grinds the same. In this condition the product may be used for a cattle food or for any other purpose for which cotton seed meal is now generally used.

From the foregoing it will be seen that I have produced a process for the manufacture of stock food from the residue of the cotton seed after the oil has been extracted which will be rich in protein and fat and owing to the manner of mixing the meat and hulls, a homogeneous uniform food product is obtained. Under the present system of producing such stock foods, uncooked hulls are sometimes mixed with the meat, but these uncooked hulls are of low food value, and much loss is also occasioned by the necessary mixing of the same with the seed meat. I am also aware of the fact that the whole seed has been cooked together with the hulls thereof, but in such instances it has been discovered that the proportion of the hulls or crude fiber is too great and the protein component of the resultant food is lowered to such an extent as to produce a product which is of very low food value. By means of my improved process, the hulls and meat are scientifically mixed in proper proportions so that the desired results may be obtained in the fattening of live stock. As the hulls have been thoroughly sterilized and cooked, all disease germs which might be contained therein in the raw state of the hulls are killed so that a thoroughly healthful and sanitary food ready for use when the same leaves the mill is produced.

Of course the condition of the cattle at the expiration of a predetermined length of time after they have been fed with my improved product, will disclose to the owner whether it would be desirable to increase or decrease the quantity of seed hulls, and the proportion of the hulls to the seed meat may then be varied to meet requirements.

Having thus described the invention, what is claimed is:

1. A sub-process employed in obtaining stock food from cotton seed which consists in first cleaning the seed, then removing the lint therefrom, then hulling the seed, rolling the meat and hulls together and mixing the meat with the hulls, cooking the mixture for a predetermined time and maintaining the same in an agitated condition while cooking.

2. The hereindescribed process of extracting oil from cotton seed which consists in first cleaning the seed, then delinting the same, then hulling the seed, crushing the meat and hulls together and mixing the crushed meat and hulls, said hulls forming not less than thirty per cent. of the mixture, then cooking the same for a predetermined time and maintaining the mixture in an agitated condition while cooking, then preparing the cooked mixture for the press and pressing the oil out of the meat and hulls.

3. The hereindescribed process of obtaining stock food from cotton seed which consists in cleaning the seed, removing the lint therefrom, then hulling the seed, rolling the meat and hulls together and mixing the same, then cooking the mixture under a steam pressure of approximately sixty pounds for a period of substantially thirty-five minutes and maintaining the mixture in an agitated condition during the cooking thereof, then pressing the cooked mixture to remove the oil therefrom, and finally comminuting the pressed mixture for stock food.

4. The hereindescribed process of extracting oil from cotton seed which consists in first cleaning the seed, then removing the lint and motes therefrom, then hulling the seed, rolling the meat and hulls together and mixing the same in any desired proportions, but the hulls constituting not less than thirty per cent. of the mixture, then cooking the mixture and maintaining the same in an agitated state while cooking, then preparing the mixture for the press and pressing the oil therefrom.

5. The hereindescribed process of obtaining stock food from cotton seed, which consists in removing the lint and motes from the seed, hulling the seed, then rolling the meat and hulls together and mixing the hulls and meat in a raw state, said mixture containing not less than thirty per cent. of the hulls, then cooking the mixture, then pressing the oil from the cooked meat and hulls, and finally comminuting the resultant product for stock food.

6. The hereindescribed process of obtaining stock food from cotton seed which consists in first cleaning the seed, then removing the lint and motes therefrom, then hulling the seeds, rolling the meat and hulls together to form a mixture of the raw material, then cooking the mixture, preparing the cooked mixture for the press and pressing the oil therefrom, then breaking the pressed mixture and grinding the same into a stock food.

7. The hereindescribed process for obtaining stock food from cotton seed, which consists in first cleaning the seed then removing the lint and motes therefrom, then hulling the seed, then rolling the meat and hulls together to crush the same and mixing the hulls and meats together in a raw state, the hulls forming not less than thirty per cent. of the mixture, then cooking the mixture for substantially thirty-five minutes under a steam pressure of approximately sixty pounds and maintaining the mixture in an agitated condition during the cooking thereof, then forming the cooked mixture into cakes, pressing the oil out of the mixture, breaking the cakes, and finally grinding the broken cakes into stock food.

In testimony whereof I hereunto affix my signature in the presence of two witnesses.

THOMAS H. COVEY.

Witnesses:
H. G. HALL,
H. J. SHERWOOD.